United States Patent
Wilds

(10) Patent No.: US 6,727,481 B1
(45) Date of Patent: Apr. 27, 2004

(54) HEATED CONDUIT

(76) Inventor: Robert C. Wilds, 1255 Hungry Hollow Rd., Leechburg, PA (US) 15656

( * ) Notice: Subject to any disclaimer, the term of this patent is extended or adjusted under 35 U.S.C. 154(b) by 0 days.

(21) Appl. No.: 10/455,950

(22) Filed: Jun. 6, 2003

(51) Int. Cl.[7] .............................. H05B 3/54; H05B 3/58
(52) U.S. Cl. ....................................... 219/549; 392/468
(58) Field of Search ................. 392/478, 472, 392/479, 465–468; 219/549

(56) References Cited

U.S. PATENT DOCUMENTS

| | | |
|---|---|---|
| 3,275,803 A | 9/1966 | True |
| 3,784,785 A | 1/1974 | Noland |
| D314,042 S | 1/1991 | Berg |
| 5,381,511 A | 1/1995 | Bahar et al. |
| 5,791,377 A | 8/1998 | La Rochelle |
| 5,911,748 A | 6/1999 | Boxum |
| 5,933,574 A * | 8/1999 | Avansino .................... 392/468 |
| 5,950,867 A | 9/1999 | Martindale et al. |
| 5,974,227 A * | 10/1999 | Schave ...................... 392/478 |

* cited by examiner

*Primary Examiner*—Edward K. Look
*Assistant Examiner*—Thor Campbell

(57) ABSTRACT

A heated conduit system is disclosed for preventing the freezing of a fluid flowing therethrough, and includes an elongate flexible hose including an inner wall for containing the fluid flowing through the elongate flexible hose and an outer wall for encasing the inner wall of the elongate flexible hose. The system also includes a flexible heating element for raising a temperature of the fluid flowing through the elongate flexible hose. The flexible heating element is fixedly positioned between the inner and outer walls of the elongate flexible hose for transferring heat through the inner wall to the fluid flowing through the elongate flexible hose. The system also includes a temperature control system for maintaining the temperature of the fluid, and the temperature control system is integrally mounted on the flexible hose for movement with the hose.

10 Claims, 4 Drawing Sheets

HEATED CONDUIT

BACKGROUND OF THE INVENTION

1. Field of the Invention

The present invention relates to heated conduits and more particularly pertains to a new heated conduit for controlling the temperature of a fluid inside the conduit such that the fluid is prevented from freezing when the outside temperature falls below freezing.

2. Description of the Prior Art

Conduits carrying water may be employed in locations that are relatively cold and often exposed to the environment. For example, a conduit such as a hose is often used to connect the water supply system of a recreational vehicle to a source of potable water, such as a faucet mounted on a structure. The conduit is connected at the time that the recreational vehicle is moved to a new site, and then disconnected once the recreational vehicle is to be moved from the site. Thus, in this application, the conduit is subjected to repeated connections and disconnections during its lifetime. Further, during the time period that the conduit is connected, the conduit is typically exposed to the elements and may be subjected to some rough conditions, especially toward the end portion that is connected to the recreational vehicle where the conduit may extend outwardly from the side wall of the vehicle.

Further, the use of heated conduits is known in the prior art. Known prior art includes U.S. Pat. No. 5,933,574 to Avansino; U.S. Pat. No. 5,974,227 to Schave, U.S. Pat. No. 5,381,511 to Bahar et al., U.S. Pat. No. 5,950,867 to Martindale et al. U.S. Pat. No. 5,791,377 to Larochelle; U.S. Pat. No. 3,784,785 to Noland; U.S. Pat. No. 5,911,748 to Boxum; U.S. Pat. No. 3,275,803 to True; and U.S. Pat. No. Des. 314,042 to Berg.

While the devices and system disclosed in these patents may fulfill their respective, particular objectives and requirements, the systems of the aforementioned patents are not believed to be suited to use in conditions where the conduits may be exposed to the environment for long periods of time, repeatedly connected and disconnected, and periodically exposed to rough handling or treatment.

For example, the Avansino patent teaches a heated fluid conduit that has no means for controlling the temperature of the fluid or the power supplied to the heating elements, and only has an alarm assembly that is activated only upon a complete loss of power to the conduit. The alarm system is mounted on the power cord, away from the conduit, and thus may be subject to damage when whipped or flopped around with the power cord. This may especially be a problem when the Avansino conduit is repeatedly connected and disconnected and transported between locations.

Also, the Schave patent teaches a heated hose in which a temperature controller is located on a kettle housing far removed from the hose, making it difficult, if not impossible, to move with the hose for repeated connections and disconnections.

In these respects, the heated conduit according to the present invention substantially departs from the conventional concepts and designs of the prior art, and in so doing provides an apparatus primarily developed for the purpose of controlling the temperature of a fluid inside the conduit such that the fluid is prevented from freezing when the outside temperature falls below freezing.

SUMMARY OF THE INVENTION

In view of the foregoing disadvantages inherent in the known types of heated conduits now present in the prior art, the present invention provides a new heated conduit construction wherein the same can be utilized for controlling the temperature of a fluid inside the conduit such that the fluid is prevented from freezing when the outside temperature falls below freezing.

To attain this, the present invention comprises a heated conduit system for preventing the freezing of a fluid flowing therethrough, and includes an elongate flexible hose including an inner wall for containing the fluid flowing through the elongate flexible hose and an outer wall for encasing the inner wall of the elongate flexible hose. The system also includes a flexible heating element for raising a temperature of the fluid flowing through the elongate flexible hose. The flexible heating element is fixedly positioned between the inner and outer walls of the elongate flexible hose for transferring heat through the inner wall to the fluid flowing through the elongate flexible hose. The system also includes a temperature control system for maintaining the temperature of the fluid, and the temperature control system is integrally mounted on the flexible hose for movement with the hose.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new heated conduit apparatus and method which has many of the advantages of the heated conduits mentioned heretofore and many novel features that result in a new heated conduit which is not anticipated, rendered obvious, suggested, or even implied by any of the prior art heated conduits, either alone or in any combination thereof.

It is another object of the present invention to provide a new heated conduit which may be easily and efficiently manufactured and marketed.

It is a further object of the present invention to provide a new heated conduit which is of a durable and reliable construction.

An even further object of the present invention is to provide a new heated conduit which is susceptible of a low cost of manufacture with regard to both materials and labor, and which accordingly is then susceptible of low prices of sale to the consuming public, thereby making such heated conduit economically available to the buying public.

Still yet another object of the present invention is to provide a new heated conduit which provides in the apparatuses and methods of the prior art some of the advantages thereof, while simultaneously overcoming some of the disadvantages normally associated therewith.

Still another object of the present invention is to provide a new heated conduit for controlling the temperature of a fluid inside the conduit such that the fluid is prevented from freezing when the outside temperature falls below freezing.

Yet another object of the present invention is to provide a new heated conduit which includes an elongate flexible hose including an inner wall for containing the fluid flowing through the elongate flexible hose and an outer wall for encasing the inner wall of the elongate flexible hose. The system also includes a flexible heating element for raising a temperature of the fluid flowing through the elongate flexible hose. The flexible heating element is fixedly positioned between the inner and outer walls of the elongate flexible hose for transferring heat through the inner wall to the fluid flowing through the elongate flexible hose. The system also includes a temperature control system for maintaining the temperature of the fluid, and the temperature control system is integrally mounted on the flexible hose for movement with the hose.

Still yet another object of the present invention is to provide a new heated conduit that monitors and maintains the temperature of the fluid without being on constantly, thereby conserving energy.

Even still another object of the present invention is to provide a new heated conduit that is simple to install and utilize.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
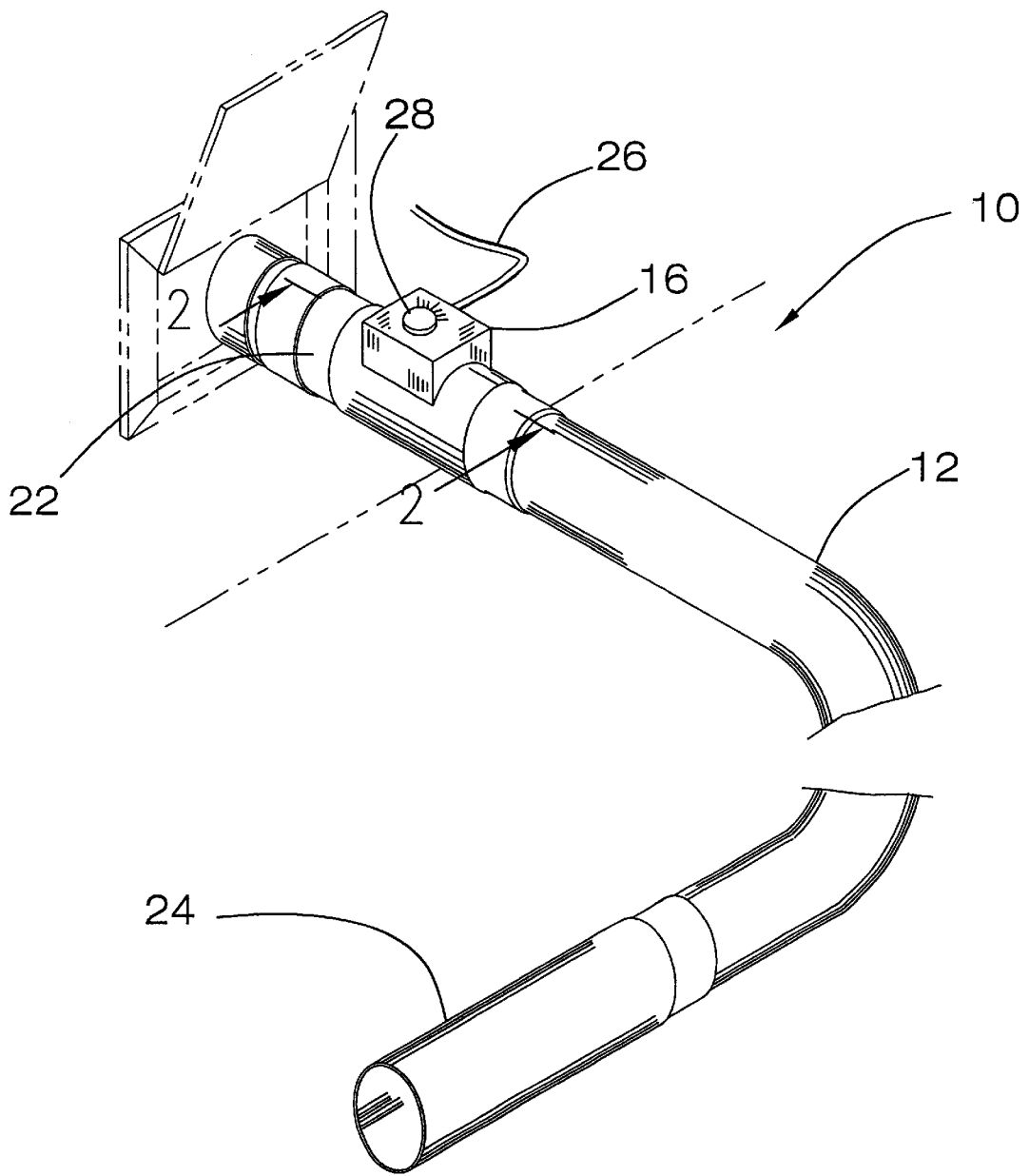
FIG. 1 is a schematic perspective view of a new heated conduit according to the present invention.
Figure 2:
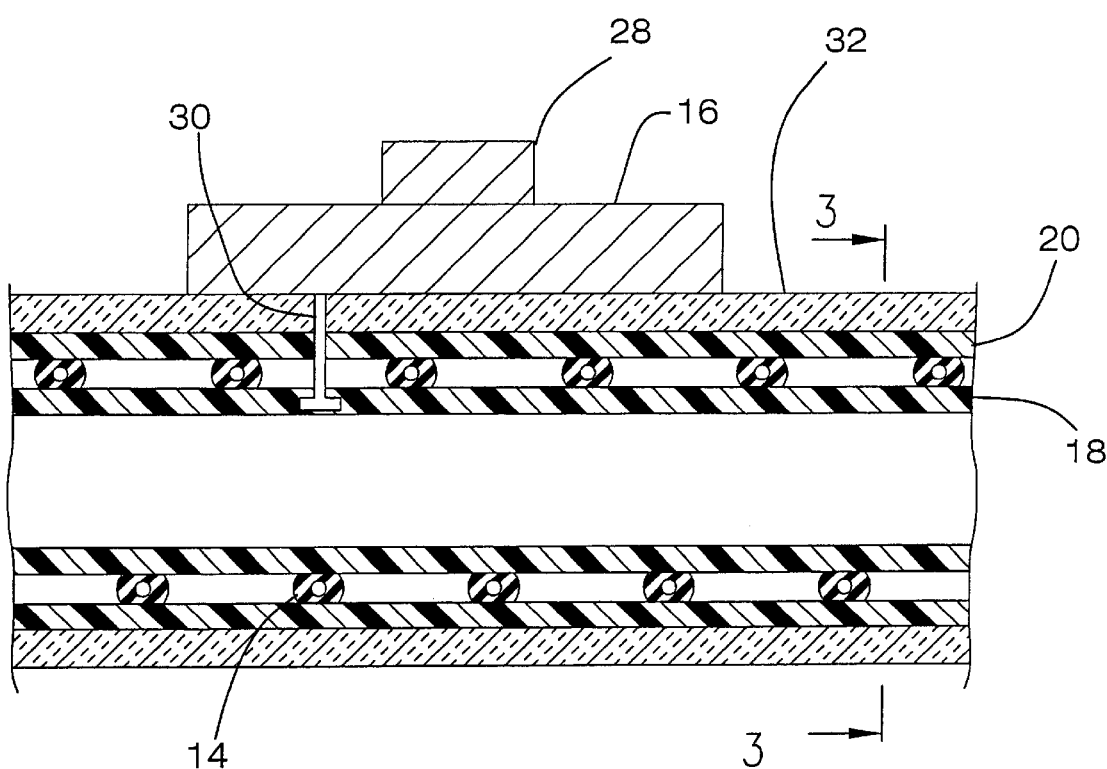
FIG. 2 is a schematic cross-sectional side view of the present invention.
Figure 3:
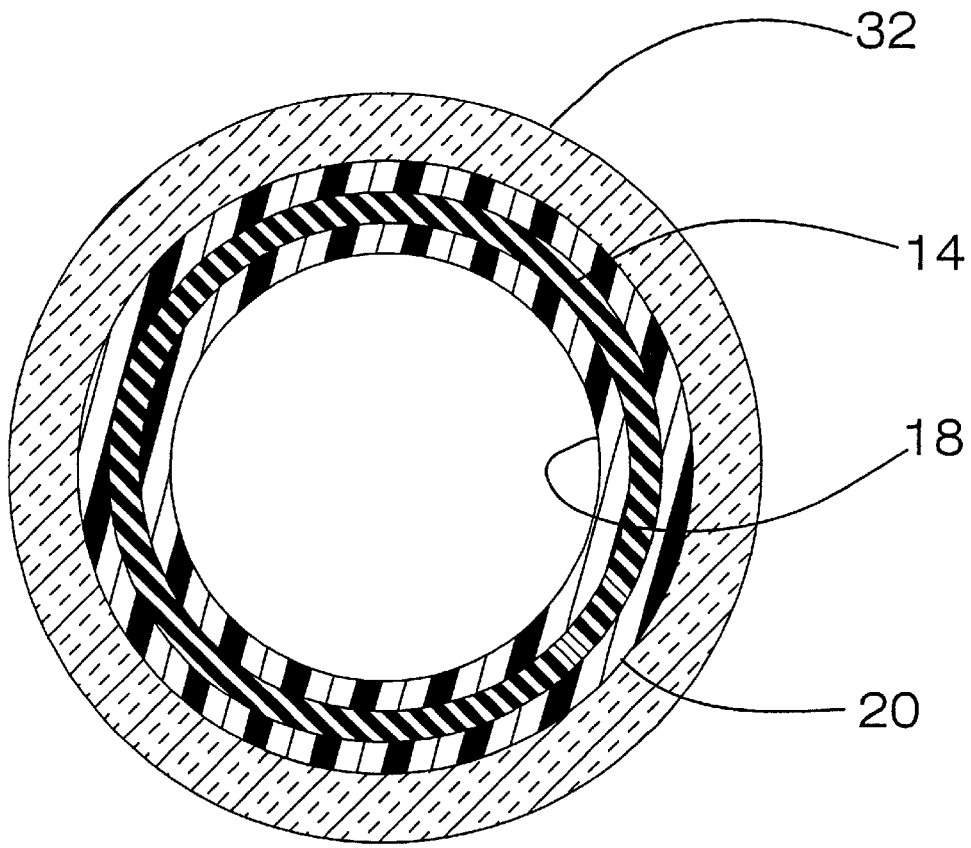
FIG. 3 is a schematic cross-sectional end view of the present invention.
Figure 4:
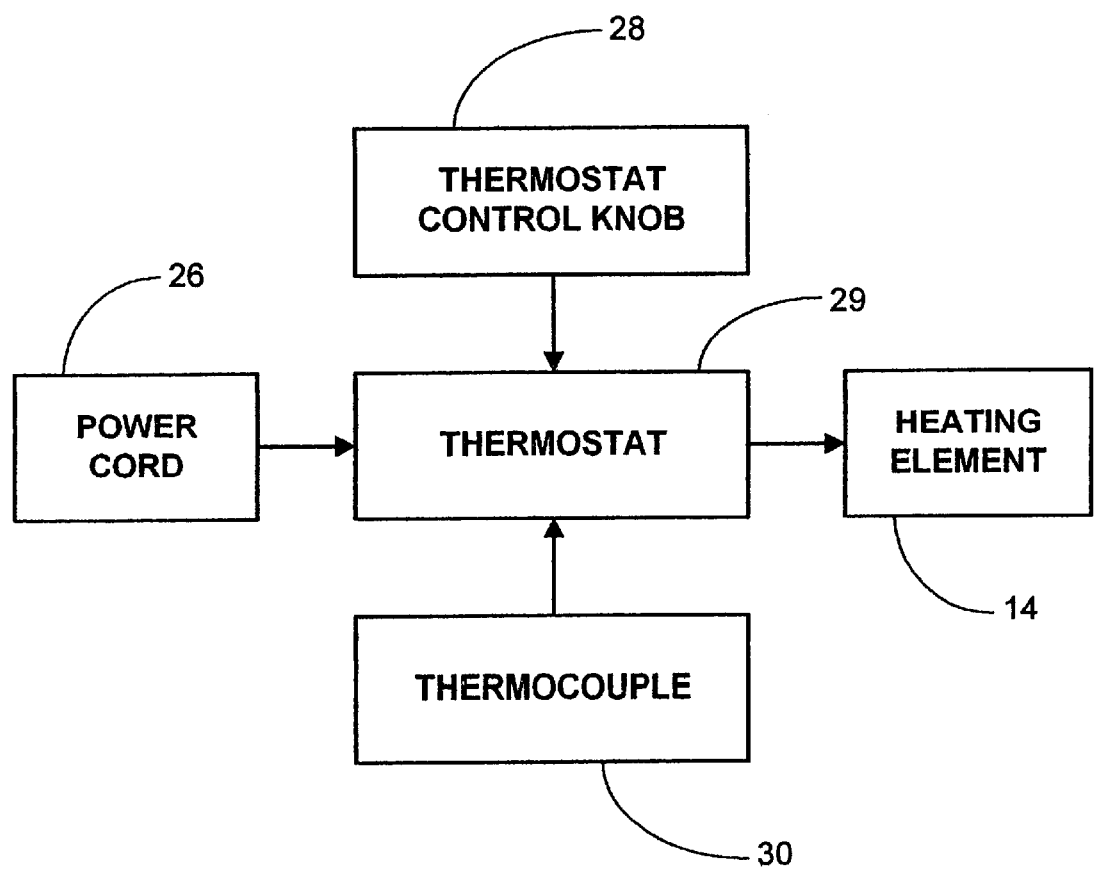
FIG. 4 is a schematic diagrammatic view of the present invention.

With reference now to the drawings, and in particular to FIGS. 1 through 4 thereof, a new heated conduit embodying the principles and concepts of the present invention and generally designated by the reference numeral 10 will be described.

As best illustrated in FIGS. 1 through 4, the heated conduit 10 generally comprises an elongate flexible hose 12, a flexible heating element 14 on the hose 12 for raising the temperature of the fluid flowing through the hose, and a temperature control system 16 mounted on the hose 12 for maintaining the temperature of the fluid at approximately a desired, preset temperature level.

In greater detail, the elongate flexible hose 12 includes an inner wall 18 and an outer wall 20. The inner wall 18 contains the fluid flowing through the elongate flexible hose 12, while the outer wall 20 encases the heating element 14 as well as the inner wall 18 of the hose 12. The elongate flexible hose 12 includes a first end 22 and a second end 24. The ends 22, 24 each include a coupling means for coupling to a fluid supply and a destination for the fluid.

As alluded to previously, the flexible heating element 14 is fixedly positioned between the inner 18 and outer 20 walls of the flexible hose 12. The heating element 14 is heated, for example, by the passage of electricity therethrough, and transfers heat through the inner wall 18 of the hose 12 to the fluid flowing through the hose 12. The heating element 14 preferably extends along substantially an entire length of the hose 12 such that heat from the heating element 14 is distributed throughout the entire length of the elongate flexible hose 12 and the fluid is exposed to the heat at virtually all points along the length of the hose 12.

The heating element 14 is operationally coupled to a plug (not shown) and a power cord 26. The power cord 26 is for transferring electricity to the flexible heating element 14. The power cord 26 extends from the flexible hose 12 at a location preferably located near one of the ends 22, 24 of the hose 12.

The temperature control system 16 controls the flow of electrical power to the flexible heating element 14 from the power cord 26 in order to control the degree of heating of the heating element 14 and the resulting heating of the fluid in the hose 12. Significantly, the temperature control system 16 is integrally mounted on the elongate flexible hose (see FIG. 1) so that the control system 16 moves with the hose 12 and in some embodiments of the invention is inseparably mounted on the hose 12 so that the system 16 is not able to move or flop around separately of the hose 12. The control system 16 may extend or protrude outwardly from the outer wall 20 of the hose 12. In one embodiment of the invention, the temperature control system 16 is located proximal the first end 22 of the flexible hose 12, which may be suitable for coupling to the destination for the fluid, such as a coupling on a recreational vehicle.

The temperature control system 16 may include a thermostat control 28 for actuating a thermostat 29 that controls the flow of electricity from the power cord 26 to the heating element 14. The thermostat 29 controls the flow of power based upon the relative position of the thermostat control 28 and input from a temperature sensing device, such as a thermocouple 30. The thermocouple 30 may be mounted on the inner wall 18 of the flexible hose 12 for sending the temperature of the fluid through the wall 18. The thermocouple 30 is operationally coupled to the thermostat 29 of the temperature control system 16 such that the thermocouple 30 allows the temperature of the fluid flowing through the elongate flexible hose 12 to be sensed and maintained by the thermostat 29.

The elongate flexible hose 12 may include including an insulating cover 32. The insulating cover 32 is positioned over the flexible heating element 14 of the elongate flexible hose 12 for containing the heat produced by the flexible heating element 14 within the elongate flexible hose 12 and the fluid carried by the hose 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heated conduit system for preventing the freezing of a fluid flowing therethrough, the heated conduit system comprising:
    an elongate flexible hose including an inner wall for containing the fluid flowing through said elongate flexible hose and an outer wall for encasing said inner wall of said elongate flexible hose, said elongate flexible hose having a first end and a second end;
    a flexible heating element for raising a temperature of the fluid flowing through said elongate flexible hose, said flexible heating element being fixedly positioned between said inner and outer walls of said elongate flexible hose for transferring heat through said inner wall to the fluid flowing through said elongate flexible hose; and
    a temperature control system for maintaining the temperature of the fluid, said temperature control system being integrally mounted on said flexible hose for movement with said hoses;
    wherein said temperature control system includes:
        a thermostat for controlling power supplied to said heating element;
        a thermostat control for adjusting a setting of said thermostat; and
        a thermocouple for sensing a temperature of a fluid moving through said hose.

2. The system of claim 1 wherein said temperature control system extends from said outer wall of the said flexible hose.

3. The system of claim 1 wherein said temperature control system is inseparably mounted on said elongate flexible hose.

4. The system of claim 1 wherein said temperature control system is position on said flexible hose proximate to said first end of said elongate flexible hose.

5. The system of claim 1 wherein said thermocouple is positioned on said inner wall of said elongate flexible hose, said thermocouple being operationally coupled to said thermostat for permitting said thermostat to detect a temperature of the fluid.

6. The system of claim 1 additionally comprising a power cord being operationally coupled to said flexible heating element for transmitting electrical power to said flexible heating element.

7. The system of claim 1 wherein said ends of said elongate flexible hose each have coupling means for coupling to a fluid supply and a destination for the fluid.

8. The system of claim 1 wherein said elongate flexible hose includes an insulating cover positioned over said outer wall of said flexible hose for containing heat produced by said flexible heating element in said elongate flexible hose and fluid flowing therethrough.

9. The system of claim 1 wherein said flexible heating element is positioned along an entire length of said elongate flexible hose such that heat from said flexible heating element is distributed throughout the entire length of said elongate flexible hose.

10. A heated conduit system for preventing the freezing of a fluid flowing therethrough, the heated conduit system comprising:
    an elongate flexible hose including an inner wall for containing the fluid flowing through said elongate flexible hose and an outer wall for encasing said inner wall of said elongate flexible hose, said elongate flexible hose having a first end and a second end;
    a flexible heating element for raising a temperature of the fluid flowing through said elongate flexible hose, said flexible heating element being fixedly positioned between said inner and outer walls of said elongate flexible hose for transferring heat through said inner wall to the fluid flowing through said elongate flexible hose; and
    a temperature control system for maintaining the temperature of the fluid, said temperature control system being integrally mounted on said flexible hose for movement with said hose;
    wherein said temperature control system extends from said outer wall of the said flexible hose;
    wherein said temperature control system is inseparably mounted on said elongate flexible hose;
    wherein said temperature control system is position on said flexible hose proximate to said first end of said elongate flexible hose;
    wherein said temperature control system includes:
        a thermostat for controlling power supplied to said heating element;
        a thermostat control for adjusting a setting of said thermostat; and
        a thermocouple for sensing a temperature of a fluid moving through said hose;
    wherein said thermocouple is positioned on said inner wall of said elongate flexible hose, said thermocouple being operationally coupled to said thermostat for permitting said thermostat to detect a temperature of the fluid;
    a power cord being operationally coupled to said flexible heating element for transmitting electrical power to said flexible heating element;
    wherein said ends of said elongate flexible hose each have coupling means for coupling to a fluid supply and a destination for the fluid;
    wherein said elongate flexible hose includes an insulating cover positioned over said outer wall of said flexible hose for containing heat produced by said flexible heating element in said elongate flexible hose and fluid flowing therethrough;
    wherein said flexible heating element is positioned along an entire length of said elongate flexible hose such that heat from said flexible heating element is distributed throughout the entire length of said elongate flexible hose.

* * * * *